United States Patent
Lin et al.

(10) Patent No.: US 8,488,913 B2
(45) Date of Patent: Jul. 16, 2013

(54) METHOD AND SYSTEM FOR EXAMPLE-BASED FACE HALLUCINATION

(75) Inventors: Chia-Wen Lin, Hsinchu (TW); Chih-Chung Hsu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 463 days.

(21) Appl. No.: 12/858,442

(22) Filed: Aug. 18, 2010

(65) Prior Publication Data

US 2011/0305404 A1 Dec. 15, 2011

(30) Foreign Application Priority Data

Jun. 14, 2010 (TW) ................................ 99119334 A

(51) Int. Cl.
*G06K 9/32* (2006.01)
*G06K 9/68* (2006.01)
*G06K 9/00* (2006.01)
*G06K 9/62* (2006.01)

(52) U.S. Cl.
USPC ............ 382/299; 382/118; 382/209; 382/224

(58) Field of Classification Search
None
See application file for complete search history.

(56) References Cited

U.S. PATENT DOCUMENTS

| 7,379,611 | B2 | 5/2008 | Sun et al. | |
|---|---|---|---|---|
| 2002/0113779 | A1 | 8/2002 | Itoh et al. | |
| 2005/0220355 | A1* | 10/2005 | Sun et al. | 382/254 |
| 2008/0267525 | A1 | 10/2008 | Dai et al. | |

FOREIGN PATENT DOCUMENTS

| CN | 101216889 | 7/2008 |
|---|---|---|
| CN | 101477684 | 7/2009 |
| CN | 101615290 | 12/2009 |
| TW | 420939 | 2/2001 |

OTHER PUBLICATIONS

Jeong-Seon Park, An Example-Based Face Hallucination Method for Single-Frame, Low-Resolution Facial Images, Oct. 2008, IEEE Transactions on Image Processing, vol. 17, No. 10, pp. 1806-1816.*
The Research of face super-resolution based on manifold learning, Wu Wei, Yang Xiao-Min, Chen Mo, Zheng Li-Xian, He Xiao-Hai, China Academic Journal Electronic Publishing House, Optical Technique, vol. 35 No. 1, Jan. 31, 2009, p. 84~p. 92.
Hallucinating Face by Eigentransformation, Xiaogang Wang and Xiaoou Tang, IEEE Transactions on Systems, Man, and Cybernetics—Part C: Applications and Reviews, vol. 35, No. 3, Aug. 31, 2005, p. 425~p. 434.
China Patent Office, Office Action, U.S. Appl. No. CN201010214704.0, Jul. 25, 2012, China.
An Example-Based Face Hallucination Method for Single-Frame, Low-Resolution Facial Images, Jeong-Seon Park, Member, IEEE, and Seong-Whan Lee, Senior Member, IEEE, IEEE Transactions on Image Processing, Vol. 17, No. 10, Oct. 2008.
Hallucinating faces: LPH super-resolution and neighbor reconstruction for residue compensation, Yueting Zhuang, Jian Zhang, Fei Wu, College of Computer Science and Technology, Zhejiang University, Hangzhou 310027, PR China accepted Mar. 11, 2007.
Image Hallucination Using Neighbor Embedding over Visual Primitive Manifolds, Wei Fan & Dit-Yan Yeung, 1-4244-1180-7/071$25.00 © 2007 IEEE.
Face Hallucination Using Olpp and Kernel Ridge Regression, B.G. Vijay Kumar and R.Aravind, 978-1-4244-1764-3/081$25.00 © 2008 IEEE, ICIP 2008.

* cited by examiner

*Primary Examiner* — Amir Alavi
*Assistant Examiner* — Kenny Cese

(57) ABSTRACT

A method for example-based face hallucination uses manifold learning to project a plurality of training images in a training database and an input low resolution (LR) face image into a same manifold domain, then iteratively refines the reconstruction basis by selecting a training set having k projected training images which best match the parts of the projected LR face image, where $k \leqq N$ and N is the number of projected training images. Through the best-match training set, a set of prototype faces are learned, and the set of prototype faces are used as the reconstruction basis to reconstruct a high resolution face image for the input LR face image.

13 Claims, 10 Drawing Sheets

| | Prior Art (Park2008) | Prior Art (Liu2007) | Prior Art (Yang2009) | Disclosed Embodiments |
|---|---|---|---|---|
| Test Image 1 | 25.5dB | 24.9dB | 25.9dB | 26dB |
| Test Image 2 | 24.7dB | 25.1dB | 25.7dB | 26.3dB |
| Test Image 3 | 25.8dB | 24.9dB | 25.9dB | 26.4dB |
| Test Image 4 | 27.3dB | 23.2dB | 27.2dB | 28.1dB |

FIG. 9

| | Additive Gaussian Noise Only | Additive Gaussian Noise With Averaging Filtering |
|---|---|---|
| Disclosed Embodiments | 83.33% | 75% |
| Prior art (Zhuang2007) | 41.66% | 33.33% |
| Prior art (Park2008) | 66.67% | 41.66% |
| Prior art (Liu2007) | 83.33% | 66.67% |
| Prior art (Yang2009) | 58.33% | 50% |

FIG. 10

METHOD AND SYSTEM FOR EXAMPLE-BASED FACE HALLUCINATION

TECHNICAL FIELD

The disclosure generally relates to a method and system for example-based face hallucination.

BACKGROUND

Face hallucination is widely used in many applications, such as, surveillance, face recognition, face expression estimation and face age estimation. For the super-resolution for face images including the concerns for generic images, the face images have a unified structure which people are very familiar with. Even only few reconstruction errors occurring in a face image can cause visually annoying artifacts. For example, geometry distortion in the mouth and eyes on a reconstructed face image may only reduce the image's objective quality slightly, whereas the subjective quality of the reconstructed face can be degraded significantly.

Due to the structure characteristic of a human face, the face hallucination technology is developed. For example, one known prior art disclosed a generic image hallucination method. By capturing the primal sketch prior data in an input image with low resolution (LR), the method obtains a high resolution details corresponding to the input LR image. Another known prior art disclosed a method for soft edge smoothness and application on alpha channel super resolution, which processes a low resolution image by performing a high resolution edge segment extraction on the low resolution image, and generates a high quality image from a low quality image.

In one published paper titled "Image Hallucination Using Neighbor Embedding over Visual Primitive Manifolds", it proposed a learning-based image hallucination method. By extracting the primitive features of the images and combining a plurality of training-concentrated primitive features, this schema obtains the high resolution primitive features of a target image. In another published paper titled "LPH super-resolution and neighbor reconstruction for residue compensation", it proposed a two-phase face hallucination technology using manifold learning characteristics, i.e., every input image has the similar distribution in manifold domain. Accordingly, through computing LR image to patch the linear combination coefficients in the manifold domain, the technology then uses the same linear combination coefficients and radial basis function to obtain a high resolution image. This technology uses manifold learning to compose high resolution image.

Yet in another published paper titled "An example-based face hallucination method for single-frame, low resolution facial images", it proposed an example-based face hallucination method. By using principal components analysis (PCA), this method decomposes LR images, uses as basis image for training, and matches human face through warping. As shown in an exemplary flowchart of FIG. 1, the technology computes the high resolution human face via computing the linear combination of a LR basis image and using the same combination in the high resolution basis image.

Yet in another published paper titled "Face hallucination using OLPP and Kernel Ridge Regression", a face hallucination method is proposed. By using Orthogonal Locality Preserving Projection (OLPP) method of manifold learning, this method performs the dimension reduction on small segments of human face and uses probability model in a low dimensional subspace to estimate the high resolution small segment with maximum possibility. Then, the kernel ridge regression (KRR) prediction model is used to modify the reconstructed face.

SUMMARY

The disclosed exemplary embodiments may provide a method and system for example-based face hallucination.

In an exemplary embodiment, the disclosed relates to a method for example-based face hallucination. The method comprises: preparing a training database with a plurality of training images and obtaining a low resolution (LR) face image to be hallucinated; using manifold learning to project the plurality of training images $I_{train}$ and the LR face image onto a same manifold, where $y_L$ representing the projected LR face image and $y_{train}$ representing the projected training images; selecting a best matching training set to $y_L$, from N projected training images $y_{train}$ of the plurality of projected training images; processing basis decomposition on the training set and $y_L$ to learn a set of prototype images, including high and low resolution prototype faces in the training set and the low resolution prototype face of $y_L$; and reconstructing a high resolution face image of the LR face image by using the prototype image set, where the difference between the high resolution prototype face of the training set and the prototype face of $y_L$, matches a threshold requirement.

In another exemplary embodiment, the disclosed relates to a system for example-based face hallucination. The system comprises a training database for collecting and storing a plurality of training images; a projection module, for receiving the plurality of training images, using a manifold learning method to obtain a projection matrix, and projecting the plurality of training images and a low resolution (LR) face image onto a same manifold domain to obtain N projected training images $y_{train}$ and a projected LR face image $y_L$; a matching module, for selecting a training set of k best matching to $y_L$, from the N projected training images $y_{train}$, $k \leq N$; a basis decomposition module, for processing basis decomposition on the training set and $y_L$, to learn an LR prototype images and a set of high resolution prototype faces of the training set, and the difference between the LR prototype face and the set of high resolution prototype faces matching a threshold; and a face hallucination module, for reconstructing a high resolution face image for the LR face image by using the LR prototype face and the set of high resolution prototype faces as a basis image.

The foregoing and other features, aspects and advantages of the disclosure will become better understood from a careful reading of a detailed description provided herein below with appropriate reference to the accompanying drawings.

BRIEF DESCRIPTION OF THE DRAWINGS

FIG. 9 shows an exemplary table for providing objective comparison of face reconstruction quality, consistent with certain disclosed embodiments.

FIG. 10 shows an exemplary table, for providing detection rate comparison among five technologies, consistent with certain disclosed embodiments.

DETAILED DESCRIPTION OF EXEMPLARY EMBODIMENTS

In a general spatial domain, the difference between human faces may not be accurately expressed. Therefore, in the present disclosure, a face database is transformed into a subspace where the face difference may be expressed, i.e., manifold domain. The disclosed exemplary embodiments use a manifold learning method to project the input image and the face images of the training database onto the same manifold domain, select appropriate face images via the use of, for example, basis decomposition to construct prototype faces, and obtain a high resolution face image by combining appropriate composition parameters and prototype face.

Figure 1:
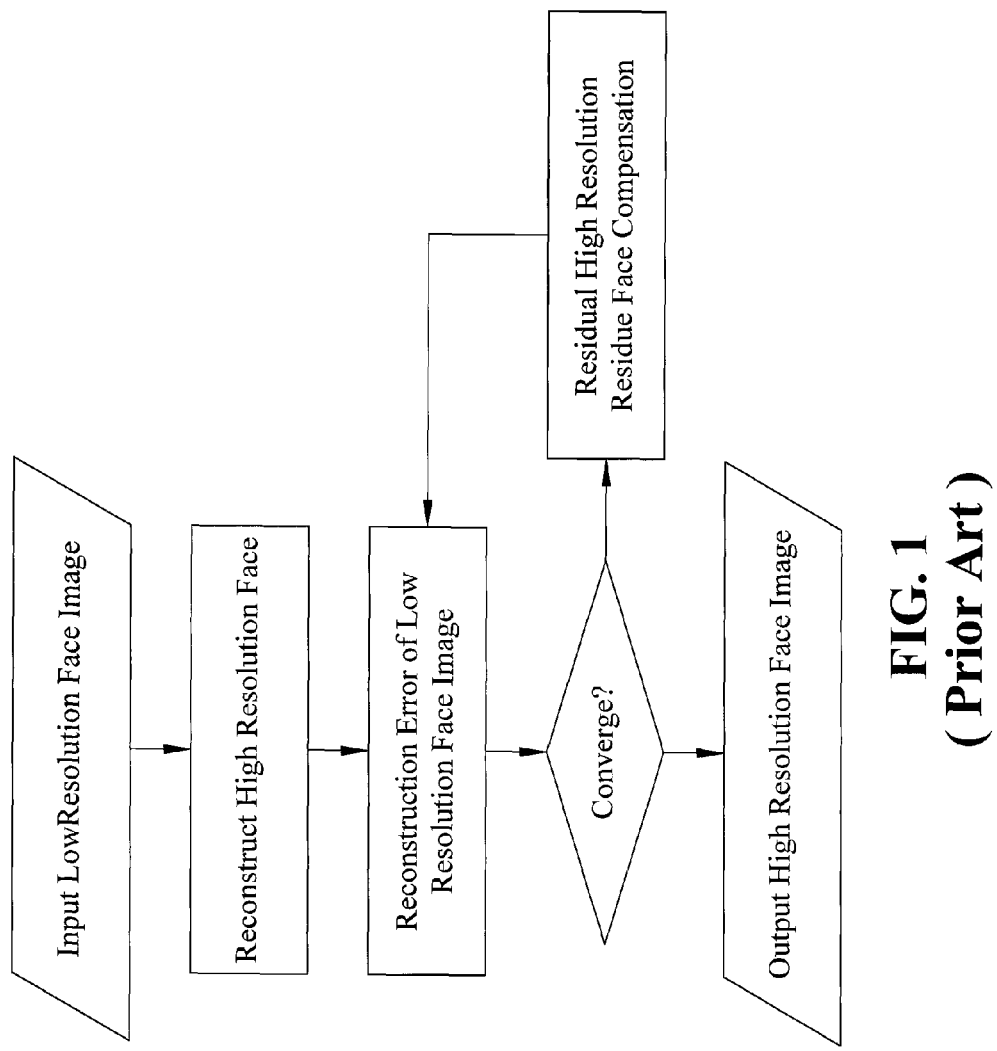
FIG. 1 shows an exemplary flowchart of a prior art for exampled-based face hallucination.
Figure 2:
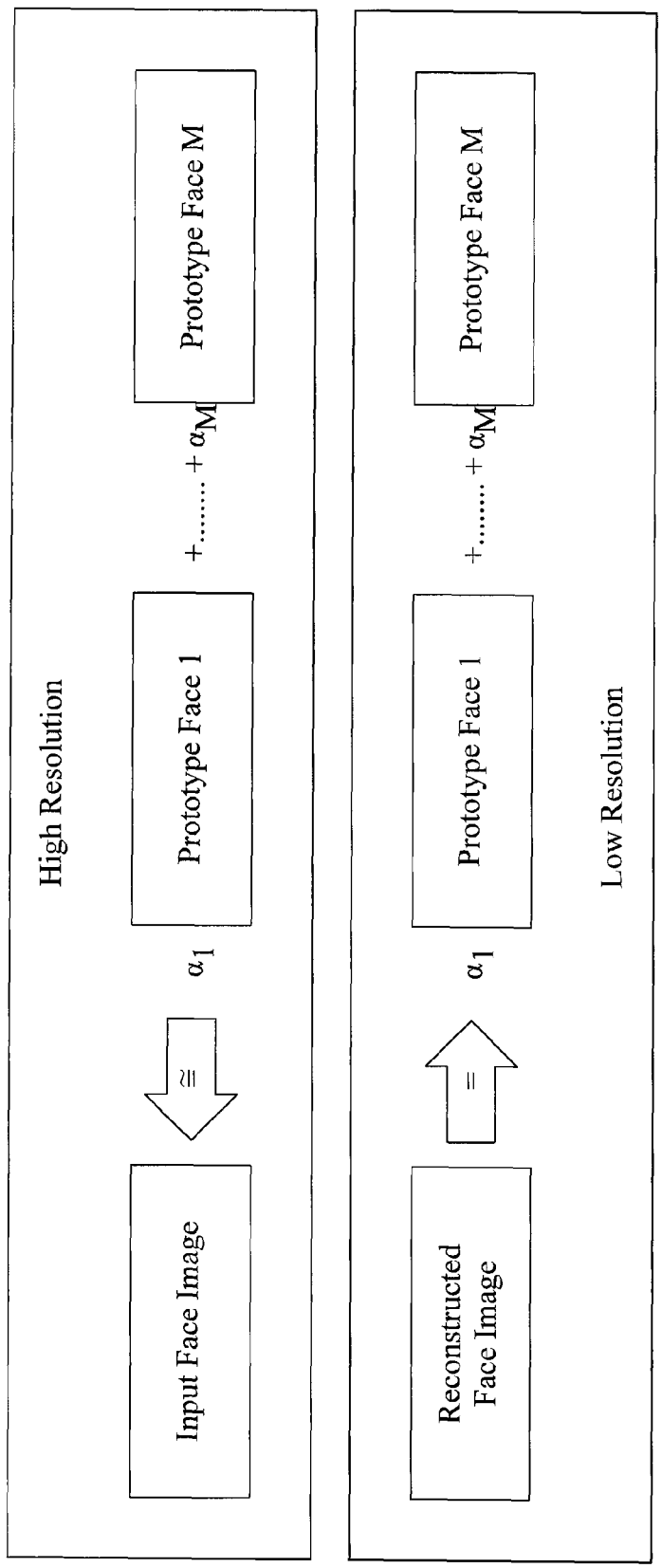
FIG. 2 shows an exemplary schematic view on how to use the computed low resolution prototype face composition parameters to reconstruct a high resolution face image.

In general, a reconstructed face image R may be expressed as:

$$I \approx P \cdot \alpha = R$$

where I is an input face image, P is a prototype face and α is the coefficients of reconstruction. Hence, via the computed LR prototype face composition parameters, such as, weightings, a reconstructed high resolution face image may be obtained by multiplying the high resolution prototype face with the same composition parameters. As shown in FIG. 2, the input LR face image I is equal to the linear combination of M LR prototype faces, where $\alpha_1$ to $\alpha_M$ are their composition parameters. Then, M high resolution prototype faces may be multiplied by $\alpha_1$ to $\alpha_M$ respectively to obtain the reconstructed high resolution face image. The composition parameters may be obtained by the following computation:

$$\alpha^* = ((P_L)^T \cdot P_L)^{-1} \cdot (P_L)^T \cdot I_L$$

where $P_L$ is the LR prototype face, $I_L$ is the input LR face image.

Figure 3:
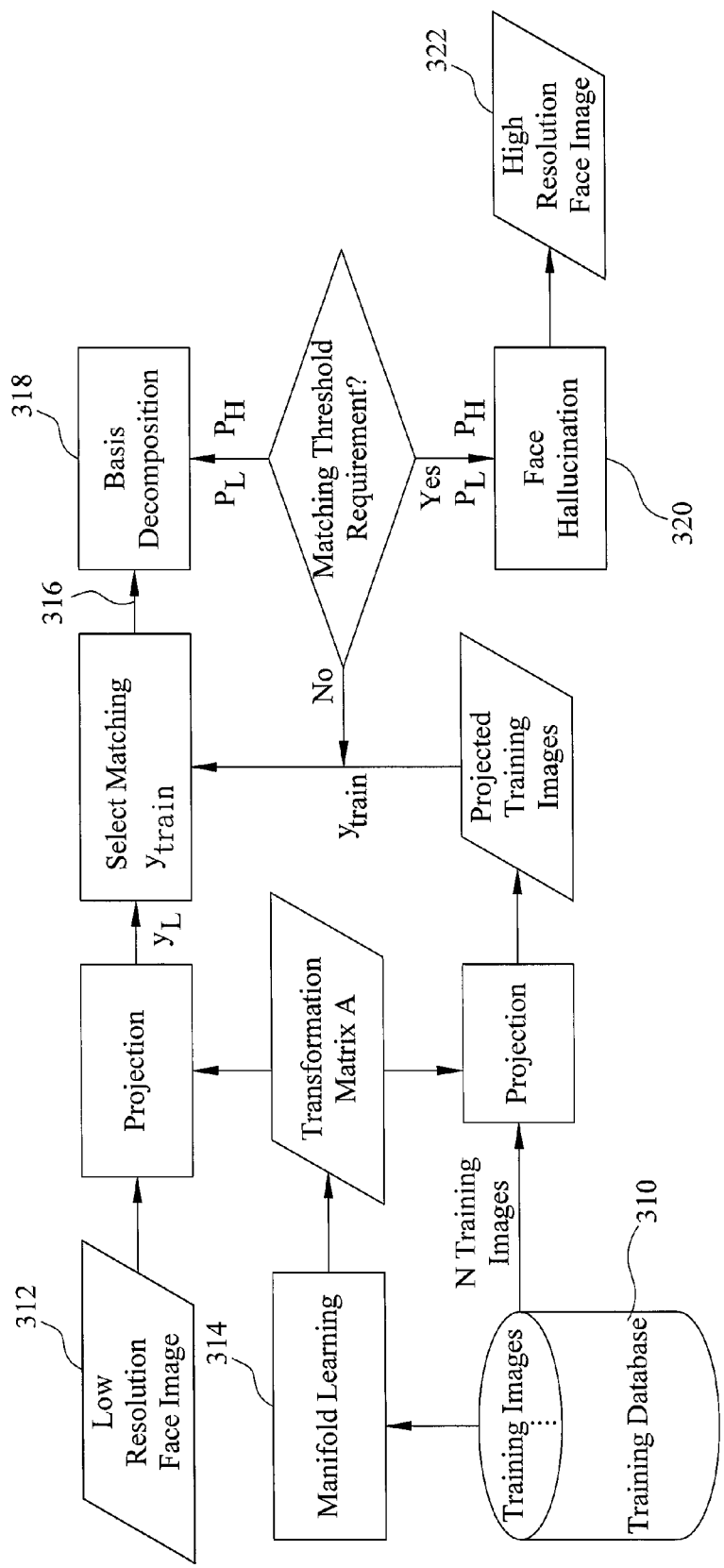
FIG. 3 shows an exemplary method for example-based face hallucination, consistent with certain disclosed embodiments.

FIG. 3 shows an exemplary method for example-based face hallucination, consistent with certain disclosed embodiments. Referring to FIG. 3, a training database 310 is prepared and an LR face image 312 to be hallucinated is inputted. Training database 310 collects training face images, generally including comprehensive training images. Then, a manifold learning 314, such as, a dimensionality reduction algorithm, is used to obtain a transformation matrix A to project N training images of training database 310 and LR face image 312 onto the same manifold domain, where $y_L$ represents projected LR face image 312 and $y_{train}$ represents projected training images. From a set $y_{train}$ of N projected training images, it may select a training set 316 matching $y_L$. Basis decomposition 318 is used to capture a set of high resolution prototype faces $P_H$ and prototype face $P_L$ of $y_L$, until a set of basis images are learned, where the difference between the high resolution prototype face set $P_H$ and the prototype face $P_L$ matches a requirement of a threshold. Then, the set of basis images is used to reconstruct a high resolution face image 322 of LR face image 312, i.e., performing example-based face hallucination 320.

By introducing manifold learning technique into training database 310, a projection matrix may be learned from training database 310. The projection matrix may project the face images in training database 310 onto a manifold domain so that the difference between faces may be clearly expressed. Through the same projection matrix, input LR face image 312 may also be projected to the same manifold. Assume that a manifold learning method, such as, a dimensionality reduction algorithm, is used to obtain a projection matrix A, then, the equation of projecting input LR image onto the manifold domain may be expressed as $y_L = A^T I_L$. A projection matrix A obtained through any manifold learning algorithm, in general, has a dimensionality smaller than the dimensionality of the original data in training database 310. For example, the dimension of high resolution face images is 64×64=4096 but the dimension after projection may only select 100.

In the set having N projected training images $y_{train}$, a method, such as, k-NN algorithm, may be used to select a set $\{y_{train}\}$ matches $y_L$, such as, selecting k most similar face images $y_{train}$ of $y_L$, from N projected training images. Through the k most similar face images $y_{train}$, a set of basis image may be obtained.

Figure 4:
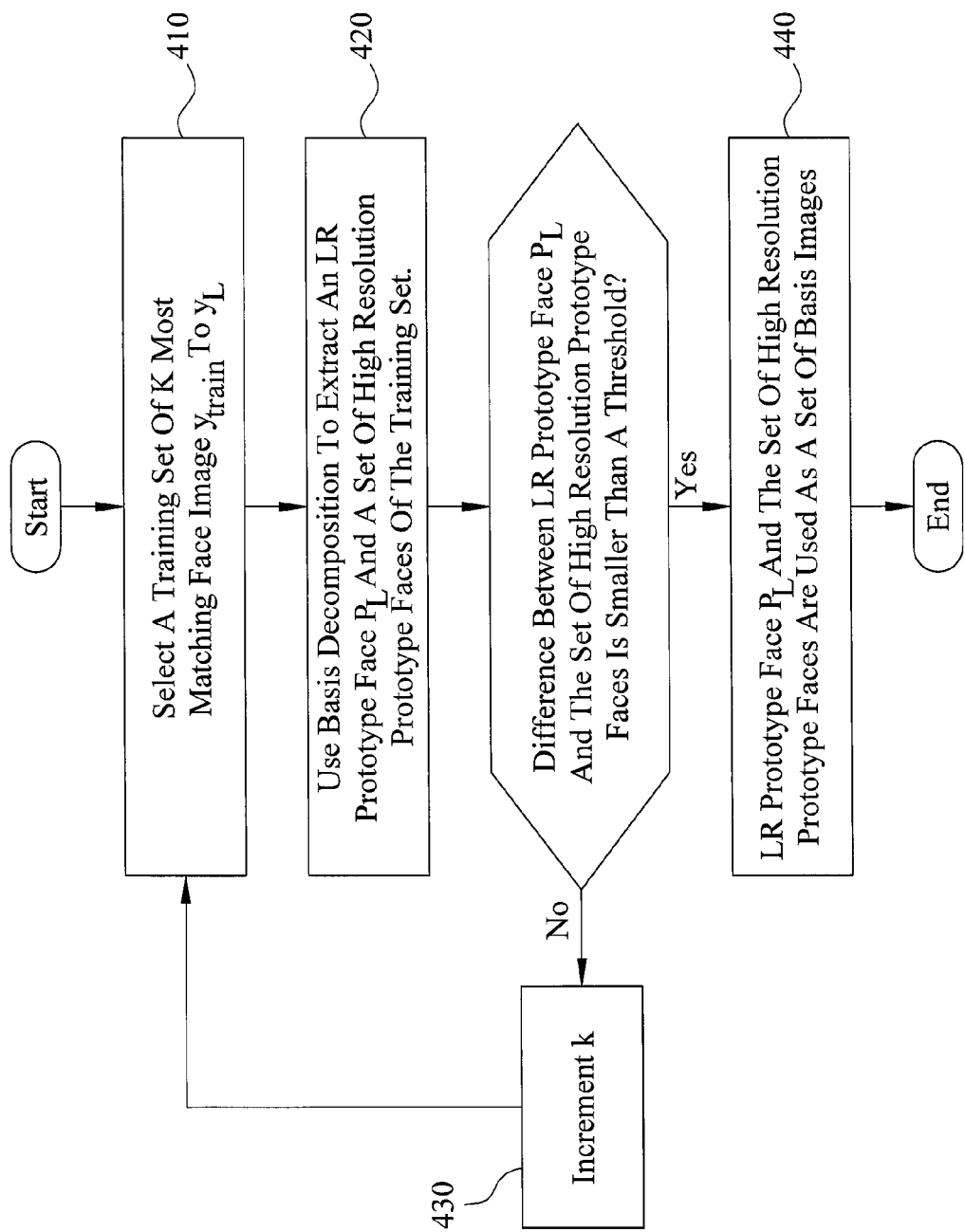
FIG. 4 shows an exemplary flowchart of selection of the training set in a manifold domain, consistent with certain disclosed embodiments.

FIG. 4 shows an exemplary flowchart of selection of the training set in a manifold domain, consistent with certain disclosed embodiments. Referring to FIG. 4, a training set of K most matching face images $y_{train}$ to $y_L$ is selected, where K≦N, as shown in step 410. With the training set, it may use basis decomposition, such as, PCA, as a basis decomposition function to extract an LR prototype face $P_L$ and a set of high resolution prototype faces of the training set, as shown in step 420. When the difference between LR prototype face $P_L$ and the set of high resolution prototype faces is smaller than a threshold, LR prototype face $P_L$ and the set of high resolution prototype faces are used as a set of basis images, as shown in step 440; otherwise, k is incremented, i.e., step 430, and steps 410-420 are repeated until the set of high resolution prototype faces matching requirement of the threshold is selected.

The set of basis images will be different for different input LR images, i.e., the basis of reconstructing LR face image 312. Because the training on the basis image is executed before reconstruction for the input LR face image 312, the situation may be prevented in which when the input face image is widely different from the face images in the training database so that reconstructing a dissimilar image is impossible. Also, the flaws in the reconstructed high resolution image caused by large difference in faces may be avoided.

In other words, once the selection of matching training set from the face database in a manifold domain is done, the basis decomposition may be used to extract a set of prototype faces. The prototype face set is also used as the basis images for future reconstruction of high resolution image. In step 410, a cost function may be used to determine k. The k determined by the cost function will make the linear combination of a prototype face set of the training set have the smallest difference from LR face image 312.

Figure 5:
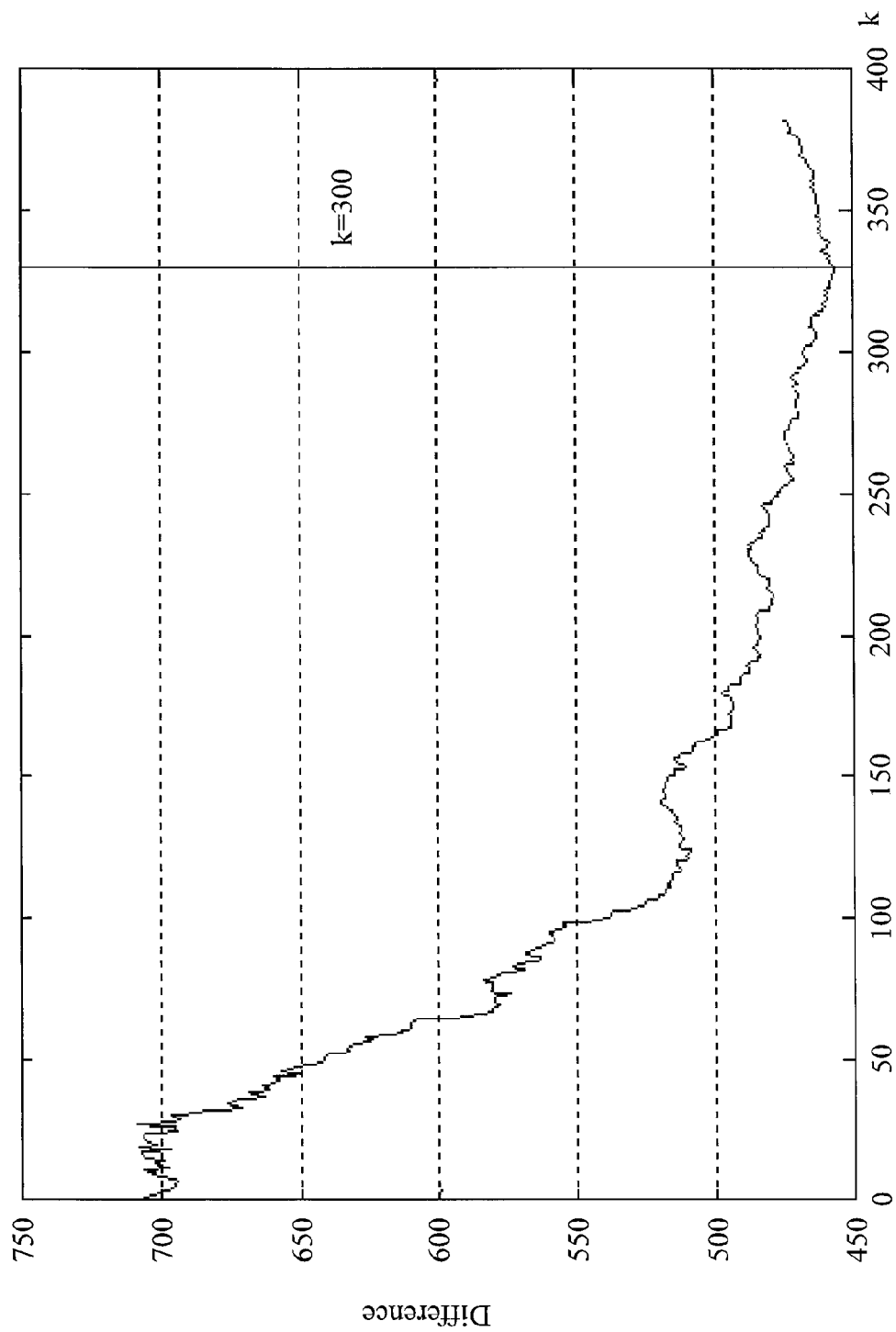
FIG. 5 shows an exemplary figure illustrating the relation between the number of selected face images $y_{train}$ (i.e. k value) and the difference, consistent with certain disclosed embodiments.

As shown in FIG. 5, when k=330, for a tested LR face image, a training set of 330 face images $y_{train}$ most matching $y_L$ may be selected from N, e.g., N=400, projected training images, wherein the difference between a set of prototype faces of the training set and the tested LR face image is the smallest. In FIG. 5, the x-axis is the number of the selected face images $y_{train}$, i.e., k, and y-axis is the difference as mentioned above.

Figure 6:
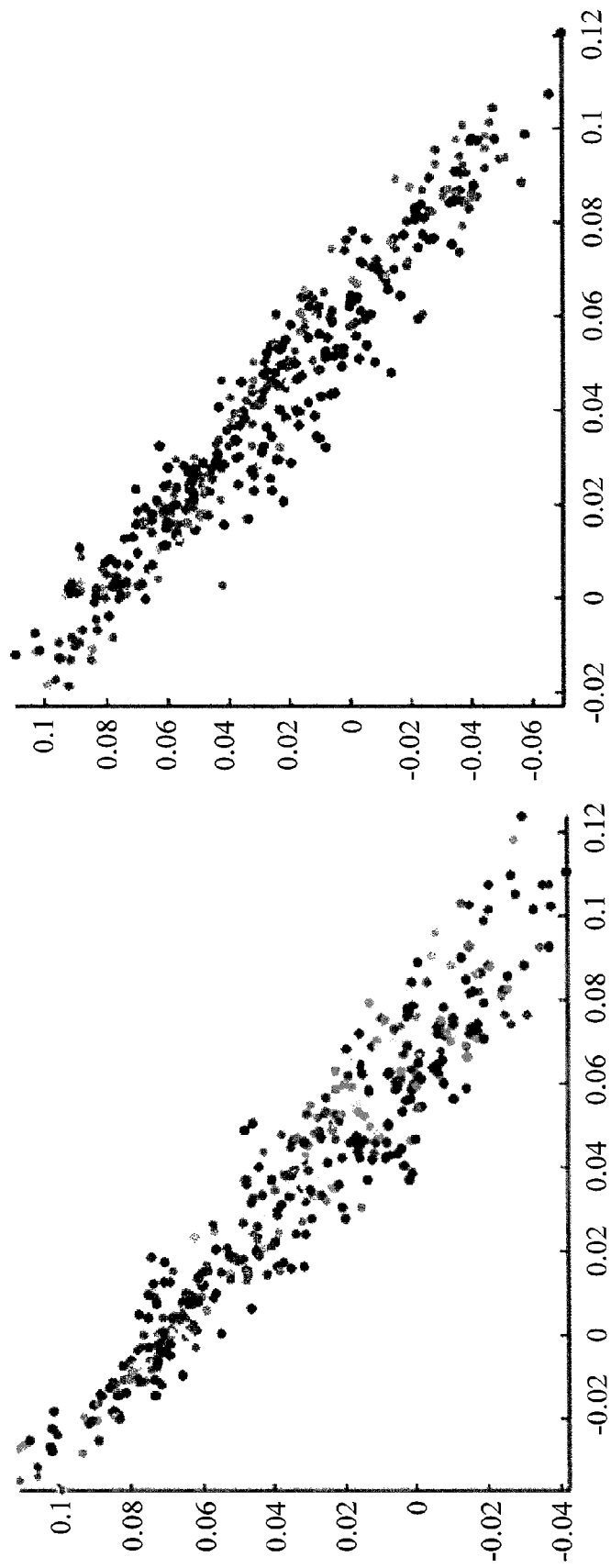
FIGS. 6A-6B respectively show exemplary schematic views illustrating the distributions of low resolution image and high resolution image after projection to manifold domain, consistent with certain disclosed embodiments.

After an LR image is obtained, the pre-processing of alignment and brightness normalization may be executed and then the selection of matching face images may be performed from the projected training image set. Through the aforementioned composition parameter computation and combining the computed parameters with the extracted basis images, a high resolution face image close to the input LR face image may be reconstructed. This is the basic theory of the example-based face hallucination of the disclosure. The theory also ensures the LR image and the high resolution image projected to the manifold domain have the similar distribution. The exemplars in FIG. 6A and FIG. 6B show the distributions of the LR image and the high resolution image projected to the manifold domain respectively, where only the first two dimensions after projection are observed. As may be seen from FIG. 6A and FIG. 6B, the exemplars have similar distribution. In other words, the LR image and the high resolution image of the plurality of training images of training database 310 after projection to manifold domain have the similar distribution.

Figure 7:
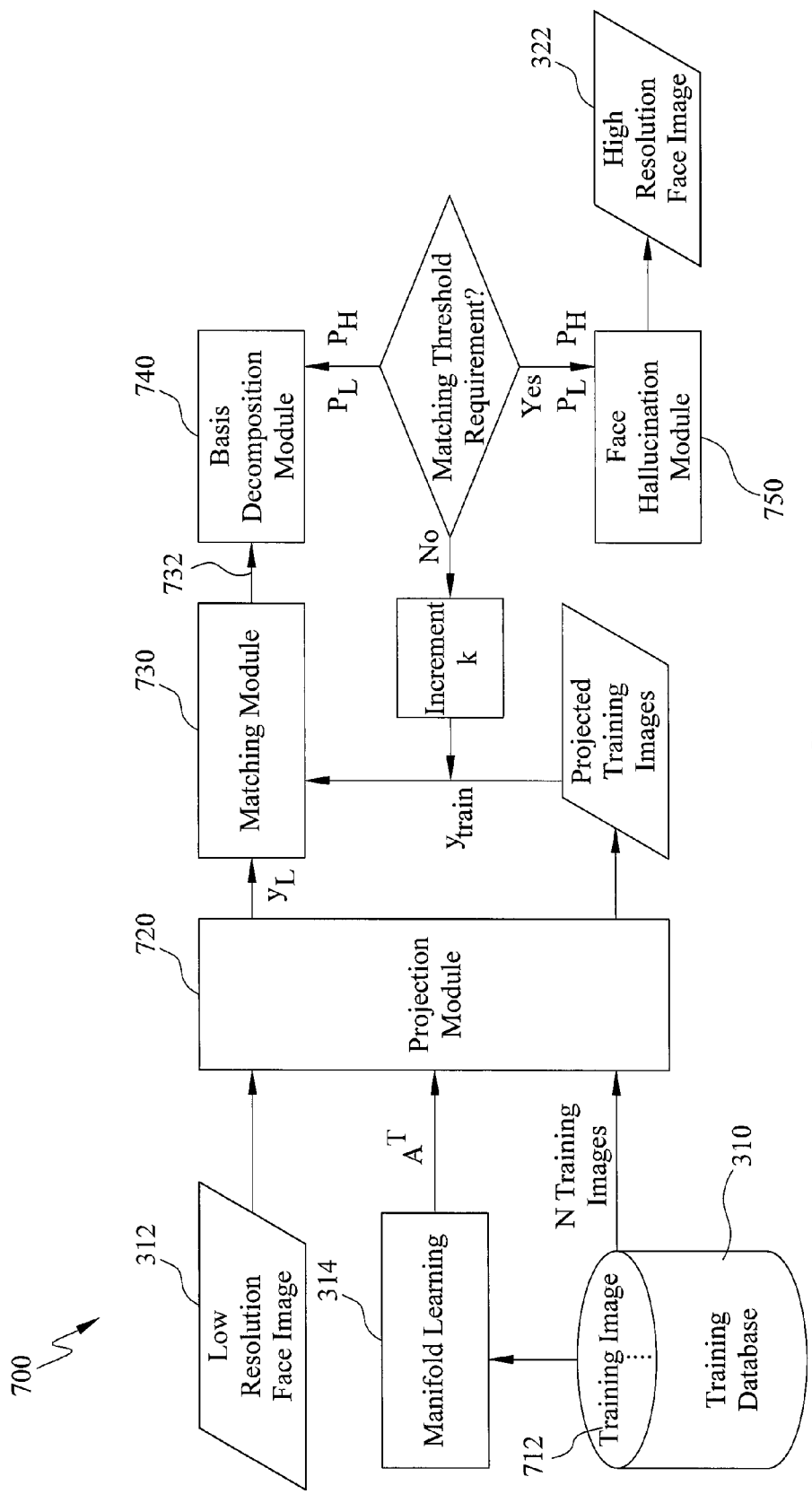
FIG. 7 shows an exemplary schematic view of a system for example-based face hallucination, consistent with certain disclosed embodiments.

Accordingly, FIG. 7 shows an exemplary schematic view of a system for example-based face hallucination, consistent with certain disclosed embodiments. In FIG. 7, face hallucination system 700 may comprise a training database 310, a projection module 720, a matching module 730, a basis decomposition module 740 and a face hallucination module 750.

Training database 310 is for collecting and storing a plurality of training images 712. Projection module 720 receives the plurality of training images 712 from training database 310, uses a manifold learning, such as, dimensionality reduction algorithm, to obtain a projection matrix A, and then projects the plurality of training images 712 and an input LR face image 312 onto the same manifold domain to obtain N projected training images $y_{train}$ and a projected LR face image $y_L$. Matching module 730 selects, such as, via k-NN algorithm, a training set 732 of k best matching to $y_L$ from the N projected training images $y_{train}$, $k \leq N$. Basis decomposition module 740 uses basis decomposition to extract an LR prototype face $P_L$ of LR face image 312 and a set of high resolution prototype faces $P_H$ of the training set.

When the difference between LR prototype face $P_L$ and the set of high resolution prototype faces does not match the requirement of a threshold, basis decomposition module 740 increments k and matching module 730 selects another training set according to the new k from N projected training images $y_{train}$. Then, basis decomposition module 740 extracts a high resolution prototype face set from the another training set until the difference between LR prototype face $P_L$ and the high resolution prototype face set matches the requirement of the threshold. Face hallucination module 750 uses LR prototype face $P_L$ and the final set of high resolution prototype faces matching the threshold requirement as a basis image to reconstruct a high resolution face 322 image of LR face image 312, for example, by combining appropriate weightings and the basis image set to obtain a high resolution face image.

Figure 8:
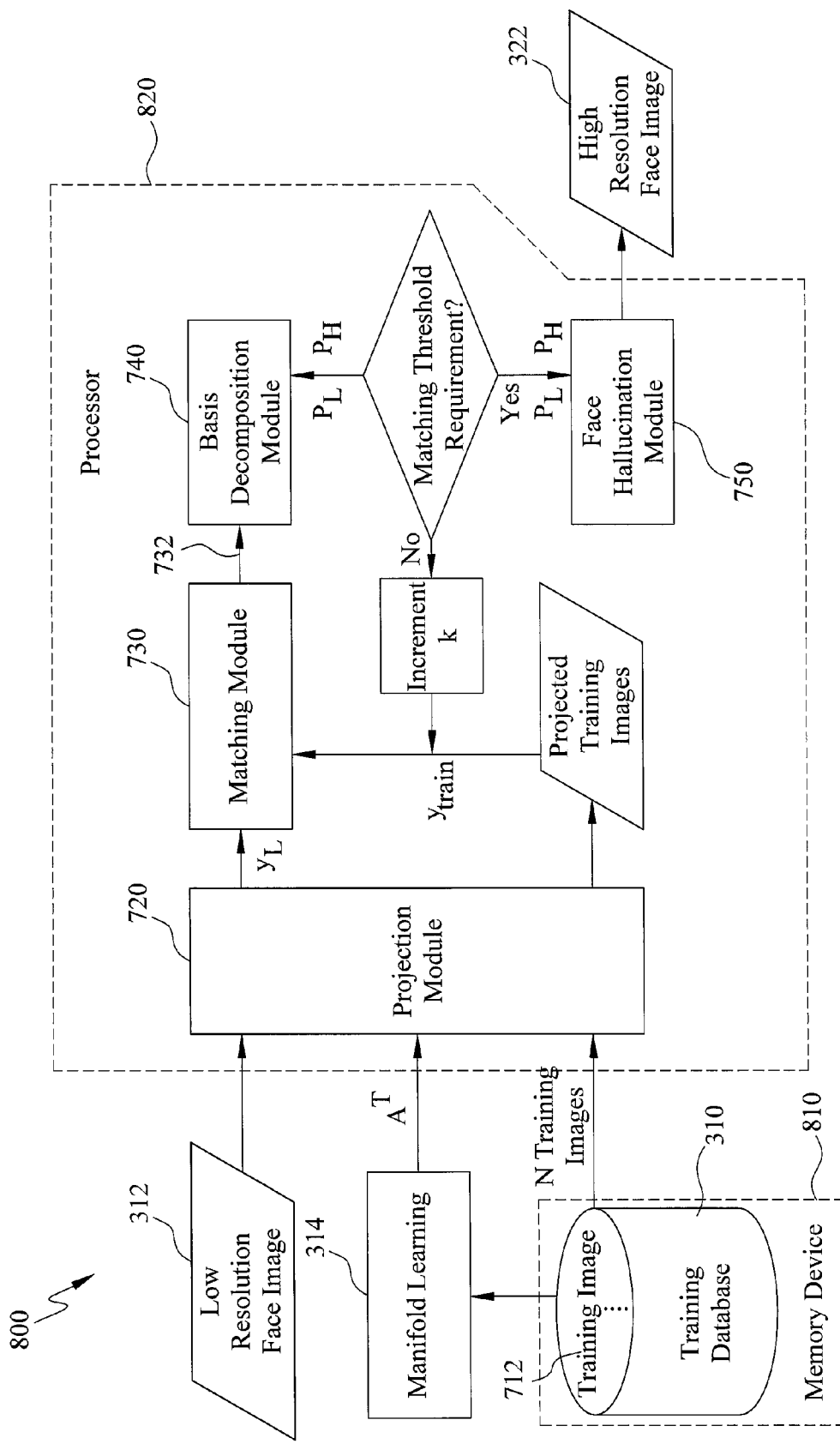
FIG. 8 shows an exemplary schematic view illustrating the system of FIG. 7 executed on a computer system, consistent with certain disclosed embodiments.

As shown in the exemplar of FIG. 8, face hallucination system 700 may be executed on a computer system 800. Computer system 800 at least includes a memory device 810 and a processor 820. Memory device 810 may be used for realize training database 310. Processor 820 has projection module 720, matching module 730, basis decomposition module 740 and face hallucination module 750. Processor 820 may receive input LR face image 312, reads training images from memory device 810, and executes the functions of aforementioned projection module 720, matching module 730, basis decomposition module 740 and face hallucination module 750, and through combining appropriate parameters to generate high resolution face image 322 for LR face image 312.

The disclosed exemplary embodiments are applied to an experiment of face imitation enhancement. In this experiment, the training set includes 483 face images. The high resolution of face images and the low resolution of the test images (image 1~image 4) are 64×64 and 16×16, respectively. PCA is used as a basis decomposition function to extract 100 prototype faces, where the k value of k-NN algorithm may be incremented between 100 and 483 and automatically determined. FIG. 9 shows an exemplary comparison table for reconstruction quality. As shown in experimental data in FIG. 9, compared to the three prior arts, the disclosed exemplary embodiments may effectively improve the face reconstruction quality.

FIG. 10 shows an exemplary table to provide the detection rate comparison of five different technologies, consistent with certain disclosed embodiments, where multi-linear PCA (MPCA) technology is used to execute face recognition. In training phase, 62 training images are included with 14 subjects. In recognition phase, 12 images are included with 6 subjects. The exemplar in FIG. 10 shows two comparisons, i.e., additive Gaussian noise only and additive Gaussian noise with averaging filtering. As may be seen from FIG. 10, in comparison with the four prior arts, the disclosed exemplary embodiments shows a high detection rate. The disclosed exemplary embodiments may select useful training set from the training database. When the difference between the input image and the database images is large, no high resolution version dissimilar to the original face will be reconstructed and no distribution of local components in manifold domain will be severely changed.

In summary, the disclosed exemplary embodiments provide a method and system for example-based face hallucination. The disclosed exemplary embodiments use manifold learning and iteratively improve the reconstruction basis image by selecting training set best matching the input LR face image. Hence, the disclosed exemplary embodiments may effectively enhance the reconstruction quality of an LR face image objectively and subjectively. In comparison with the prior arts, the disclosed exemplary embodiments may reconstruct a high resolution face image closer to the original face image and avoid the flaws in the reconstructed high resolution image caused by the large difference in faces.

Although the disclosure has been described with reference to the exemplary embodiments, it will be understood that the disclosure is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for example-based face hallucination on a face hallucination system, comprising the steps of:
preparing a training database with a plurality of training images and inputting a low resolution (LR) face image to be hallucinated;
determining a projection matrix for projecting said plurality of training images of said training database onto a manifold domain for clearly differentiating projected images of said plurality of training images using a manifold learning technique;

projecting said plurality of training images of said training database and said LR face image onto said manifold domain using said projection matrix, where $y_L$ representing a projected image of said LR face image and $y_{train}$ representing projected training images of said training; images of said training database;

selecting a training set best matching $y_L$ from N projected training images $y_{train}$, where N is not greater than a total number of said plurality of training images;

learning a set of basis images by using basis decomposition on said training set and $y_L$, said set of basis images including a set of high resolution prototype faces of in said training set and a low resolution (LR) prototype face of $y_L$; and reconstructing a high resolution face image of said LR face image by using said basis images.

2. The method as claimed in claim 1, wherein said training set further includes k face images selected from said N projected training images $y_{train}$ being most similar to said projected image $y_L$, $k \leq N$.

3. The method as claimed in claim 1, wherein said manifold learning technique uses a dimensionality reduction algorithm for obtaining said projection matrix.

4. The method as claimed in claim 1, wherein a difference between said set of high resolution prototype faces of said training set and said low resolution prototype face of $y_L$ matches a threshold requirement.

5. The method as claimed in claim 1, wherein said basis decomposition scheme uses principal component analysis (PCA) as a basis decomposition function to extract said set of basis images.

6. The method as claimed in claim 1, wherein the step of selecting said training set best matching $y_L$ from N projected training images $y_{train}$, and the step of learning said set of basis images by using basis decomposition on said training set and $y_L$, further include:

selecting k face images from N projected training images $y_{train}$ most matching said projected image of said LR face image $y_L$, $k \leq N$;

through said k face images, extracting said LR prototype face of $y_L$ and said set of high resolution prototype faces of said training set by using basis decomposition; and when a difference between said LR prototype face of $y_L$ and said set of high resolution prototype faces matches a threshold requirement, using said LR prototype face of $y_L$ and said set of high resolution prototype faces as said set of basis images; otherwise, incrementing k and repeating above two steps until said set of basis images is obtained.

7. The method as claimed in claim 6, said method uses a cost function to determine a k value, and said k value determined by said cost function minimizes the difference between said LR face image and a linear combination of a prototype face set of said training set.

8. A system for example-based face hallucination, comprising:

a training database, for collecting and storing a plurality of training images;

a projection module, for receiving said plurality of training images, using a manifold learning technique to obtain a projection matrix, and projecting said plurality of training images and an input low resolution (LR) face image onto a manifold domain to obtain N projected training images $y_{train}$ and a projected LR face image $y_L$, said projection matrix being determined by said manifold learning technique for clearly differentiating said N projected training images $t_{train}$;

a matching module, for selecting a training set of k face images best matching $y_L$ from said N projected training images $y_{train}$, $k \leq N$;

a basis decomposition module, for using basis decomposition on said training set and $y_L$ to learn an LR prototype face of $y_L$ and a set of high resolution prototype faces of said training set so that a difference between said LR prototype face of $y_L$ and said set of high resolution prototype faces matches a threshold requirement; and a face hallucination module, for reconstructing a high resolution face image for said LR face image by using said LR prototype face of $y_L$ and said set of high resolution prototype faces as a set of basis image.

9. The system as claimed in claim 8, wherein when the difference between said LR prototype face of $y_L$ and said high resolution prototype face set does not match a threshold requirement, said basis decomposition module increments k and said matching module selects another training set according to k value from N projected training images $y_{train}$, said basis decomposition module extracts another set of high resolution prototype faces until the difference between said LR prototype face of $y_L$ and said high resolution prototype face set matches said threshold requirement.

10. The system as claimed in claim 8, said face hallucination system is executed on a computer system, said computer system at least comprises:

a memory device, for realizing said training database; and a processor, further including said projection module, said matching module, said basis decomposition module, and said face hallucination module, and for receiving said input LR face and executing functions of said projection module, said matching module, said basis decomposition module, and said face hallucination module, and by combining a plurality of parameters to generate said high resolution face image for said LR face image.

11. The system as claimed in claim 8, wherein a k value of said training set of k face images is automatically determined.

12. The system as claimed in claim 8, wherein projected high resolution and low resolution images of said plurality of training images onto said manifold domain have similar distribution.

13. The system as claimed in claim 8, wherein said face hallucination module combines a plurality of appropriate parameters and said set of basis images to obtain said high resolution face image.

* * * * *